(12) United States Patent
Chowdhury et al.

(10) Patent No.: US 9,279,344 B2
(45) Date of Patent: Mar. 8, 2016

(54) VALVE POPPET ELEMENT DEFINING BALANCE CHAMBER

(71) Applicant: General Electric Company, Schenectady, NY (US)

(72) Inventors: Abhishek Chowdhury, Karnataka (IN); Guido Felice Forte, Jr., East Greenbush, NY (US); Senthil Kumar Vasudevan, Karnataka (IN)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 14/187,967

(22) Filed: Feb. 24, 2014

(65) Prior Publication Data

US 2015/0240666 A1 Aug. 27, 2015

(51) Int. Cl.
| | |
|---|---|
| *F01K 7/16* | (2006.01) |
| *F16K 31/122* | (2006.01) |
| *F01D 17/14* | (2006.01) |
| *F16K 39/02* | (2006.01) |
| *F16K 27/02* | (2006.01) |

(52) U.S. Cl.
CPC .............. *F01K 7/165* (2013.01); *F01D 17/145* (2013.01); *F16K 27/02* (2013.01); *F16K 31/122* (2013.01); *F16K 39/022* (2013.01)

(58) Field of Classification Search
CPC ......... F01K 7/165; F16K 31/122; F16K 1/02; F16K 1/32; F16K 1/34; F16K 1/48; F16K 1/487; F16K 27/00; F16K 27/02
See application file for complete search history.

(56) References Cited

U.S. PATENT DOCUMENTS

| | | | |
|---|---|---|---|
| 4,471,938 A * | 9/1984 | Schwarz | 251/25 |
| 5,074,521 A * | 12/1991 | Alexius et al. | 251/155 |
| 6,655,409 B1 | 12/2003 | Steenburgh et al. | |
| 7,223,065 B2 * | 5/2007 | Suter | 137/613 |
| 7,481,058 B2 | 1/2009 | Fukuda et al. | |
| 8,226,362 B2 | 7/2012 | Schmitz et al. | |
| 8,234,357 B2 * | 7/2012 | De Groot | 709/221 |
| 9,022,070 B2 * | 5/2015 | Anderson | 137/625.3 |
| 2009/0101859 A1 | 4/2009 | Ooishi et al. | |

* cited by examiner

*Primary Examiner* — Kevin Lee
(74) *Attorney, Agent, or Firm* — Ernest G. Cusick; Frank A. Landgraff

(57) ABSTRACT

A poppet element of a valve is provided. The poppet element is movable relative to a valve seat of the valve and includes a balance chamber wall defining a balance chamber with a center body partially fixed relative to the valve seat, an upper head, a balance chamber holder having a coefficient of thermal expansion (CTE) that is matched with that of the upper head and a fastening element disposed to fasten the balance chamber holder to the upper head. The balance chamber holder is disposed between the center body and the balance chamber wall and configured to prevent thermal loading transfer from the balance chamber wall to the fastening element.

18 Claims, 2 Drawing Sheets

VALVE POPPET ELEMENT DEFINING BALANCE CHAMBER

BACKGROUND OF THE INVENTION

The subject matter disclosed herein relates to a balance chamber defined by a poppet element of a valve and, more particularly, to a balance chamber defined by a poppet element of a high temperature valve.

Steam turbine control and stop valves often employ a balance chamber. During valve opening incidences, steam inside the balance chamber is evacuated through equalizer valves or poppet valves so that pressure inside the balance chamber is reduced and lesser hydraulic force is required to open the valve.

In order to ensure that a pressure inside the balance chamber is minimized, clearances between a valve disk and a wall of the balance chamber are often reduced as much as possible with seal rings used to provide high quality sealing characteristics. However, clearance reduction is limited since some predefined amount of clearance needs to be maintained in order to ensure that the valve opens and closes without jamming.

In certain applications, a balance chamber may be fixed to an upper head via bolts and, in some cases, the balance chamber material is different from the upper head material. The different materials have correspondingly different coefficients of thermal expansion (CTE) and, as such the upper head and the balance chamber expand at different rates when heat is generated (i.e., when the steam turbine starts up). At steady state, due to the difference in the CTEs, a bending stress is placed on the bolts and this bending stress is transmitted to the upper head via shear stress.

BRIEF DESCRIPTION OF THE INVENTION

According to one aspect of the invention, a poppet element of a valve is provided. The poppet element is movable relative to a valve seat of the valve and includes a balance chamber wall defining a balance chamber with a center body partially fixed relative to the valve seat, an upper head, a balance chamber holder having a coefficient of thermal expansion (CTE) that is matched with that of the upper head and a fastening element disposed to fasten the balance chamber holder to the upper head. The balance chamber holder is disposed between the center body and the balance chamber wall and configured to prevent thermal loading transfer from the balance chamber wall to the fastening element.

According to another aspect of the invention, a power plant valve including a poppet element movable relative to a valve seat is provided. The poppet element includes a balance chamber wall defining a balance chamber with a center body partially fixed relative to the valve seat, an upper head, a balance chamber holder having a coefficient of thermal expansion (CTE) that is matched with that of the upper head and a fastening element disposed to fasten the balance chamber holder to the upper head. The balance chamber holder is disposed between the center body and the balance chamber wall and configured to prevent thermal loading transfer from the balance chamber wall to the fastening element.

According to yet another aspect of the invention, a power plant is provided. The power plant includes a boiler element, a steam turbine, piping disposed to transport steam from the boiler element and toward the steam turbine and a valve disposed along the piping. The valve includes a valve seat and a poppet element, which is movable relative to the valve seat to open or close the valve. The poppet element includes a balance chamber wall defining a balance chamber with a center body partially fixed relative to the valve seat, an upper head, a balance chamber holder having a coefficient of thermal expansion (CTE) that is matched with that of the upper head and a fastening element disposed to fasten the balance chamber holder to the upper head. The balance chamber holder is disposed between the center body and the balance chamber wall and configured to prevent thermal loading transfer from the balance chamber wall to the fastening element.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

While balance chamber bolts may be subject to bending stress, which may be transmitted to an upper head via shear stress, in a balance chamber of a steam turbine the bending stress can be within acceptable parameters in certain situations. However, as steam turbines are designed for operation within high temperature regimes, the bending stress may exceed the acceptable parameters by such a degree that material upgrades are insufficient to prevent damage due to differences between the respective coefficients of thermal expansion (CTEs) of the upper head and the balance chamber that may be caused by the use of different materials for the upper head and balance chamber, which is driven by design requirements, manufacturability and costs.

Figure 1:
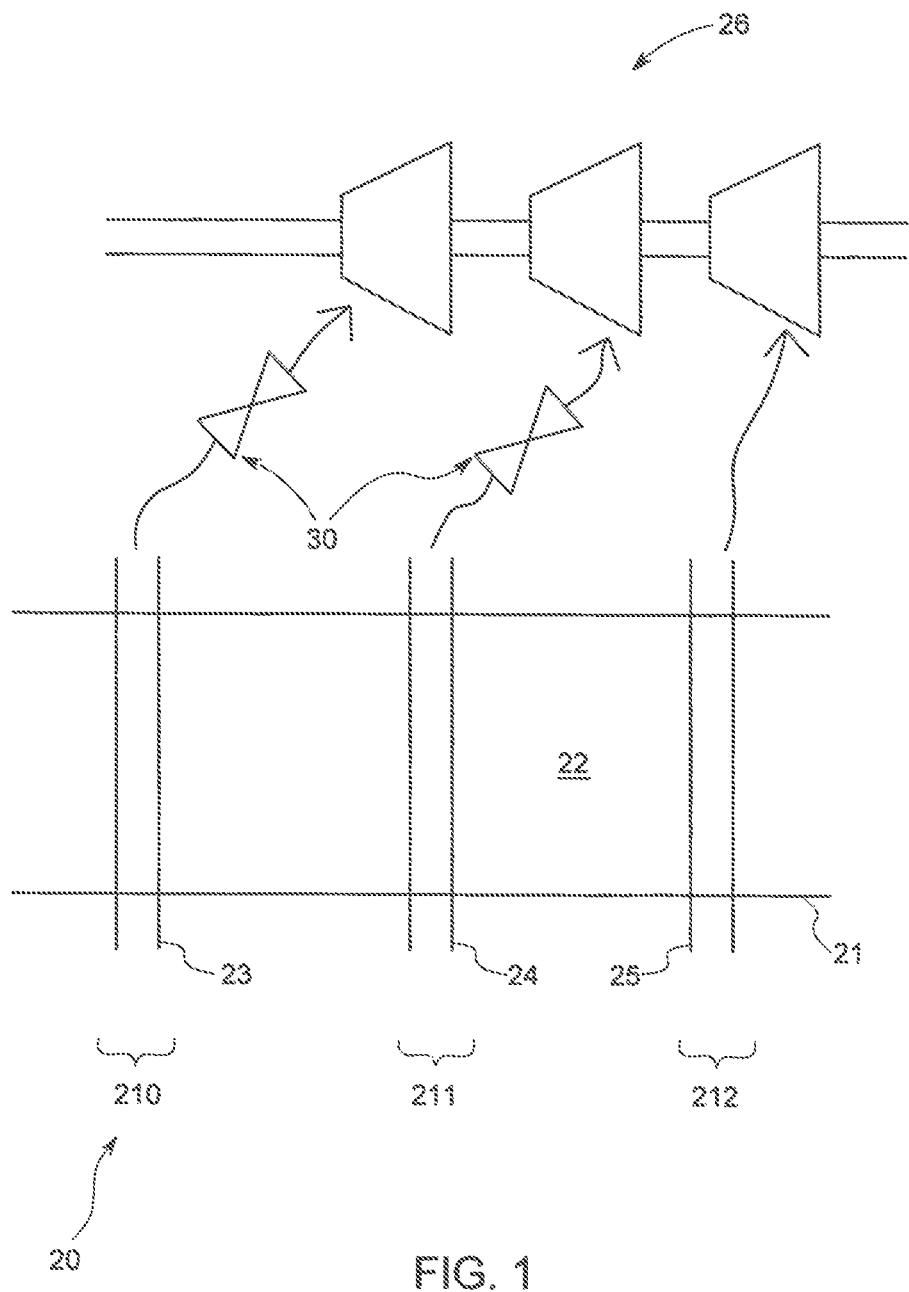
FIG. 1 is a schematic diagram of a portion of a steam turbine.
Figure 2:
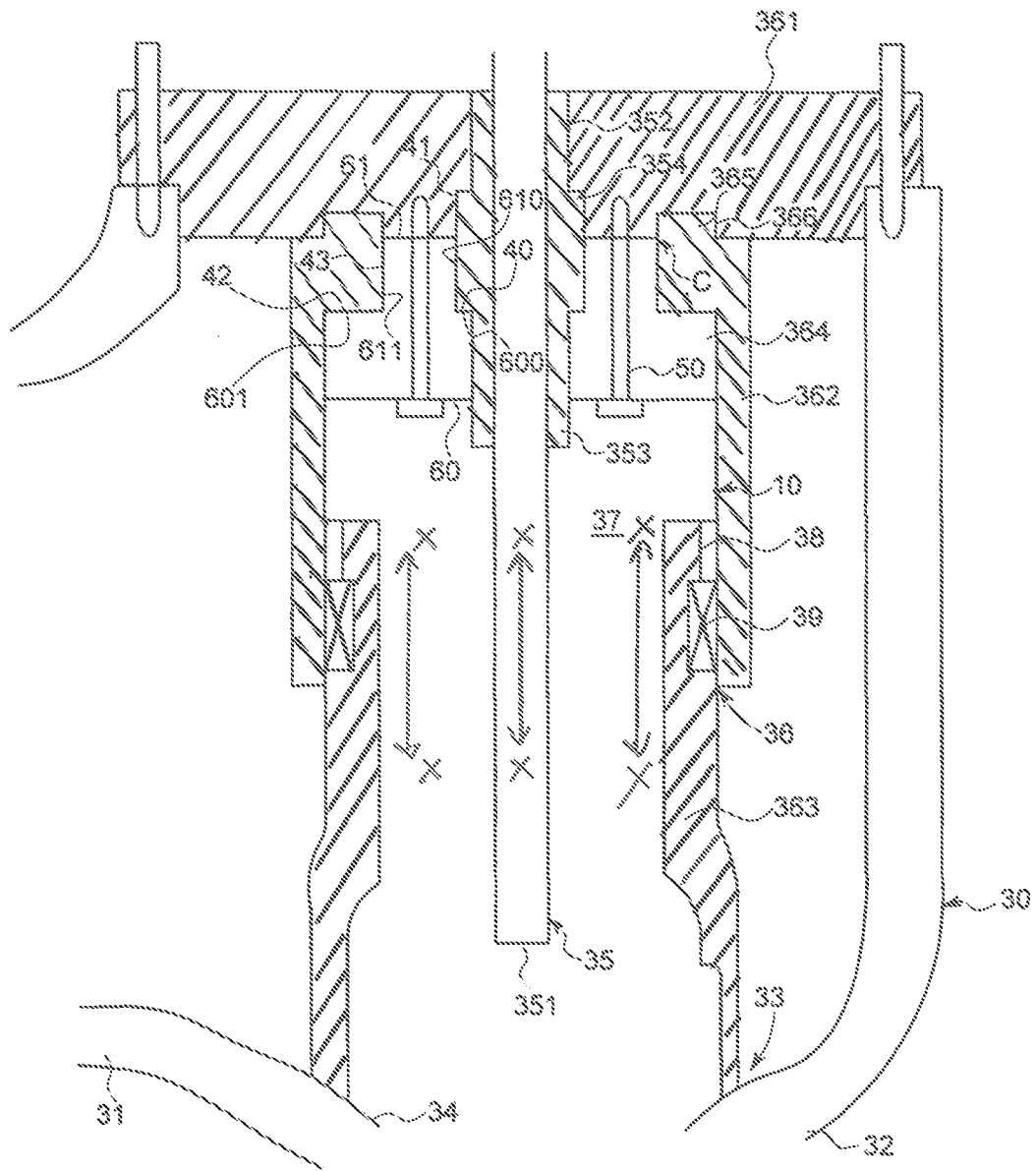
FIG. 2 a side schematic view of a balance chamber for use with the steam turbine of FIG. 1 in accordance with embodiments.

Therefore, with reference to FIGS. 1 and 2, a balance chamber 10 is provided for use in a power plant 20 or in another similar application. As shown in FIG. 1, the power plant 20 includes a boiler element 21 that is formed to define an interior 22 into which heated fluid is directed. This heated fluid may include, for example, gas turbine exhaust where the boiler element 21 is provided as a heat recovery steam generator disposed downstream from a turbine section of a gas turbine engine.

The power plant 20 further includes high pressure (HP) piping 23 disposed in an HP section 210 of the boiler element 21, intermediate pressure (IP) piping 24 disposed in an IP section 211 of the boiler element 21 and low pressure (LP) piping 25 disposed in an LP section 212 of the boiler element 21. The HP piping 23, the IP piping 24 and the LP piping 25 extend through the interior 22 and carry fluid that is heated by the heated fluid to produce steam. This steam is then transported by the HP piping 23, the IP piping 24 and the LP piping 25 toward a steam turbine 26 where the thermal energy of the steam is converted into mechanical energy that can be used to generate power or electricity.

The balance chamber 10 may be provided as a component of a combined valve 30 that is operably disposed between the IP piping 24 and the steam turbine 26. In accordance with embodiments, a valve similar to the combined valve 30 (known as a Main Stop and control valve) may also be operably disposed between the HP piping 23 and the steam turbine 26.

As shown in FIG. 2, the combined valve 30 includes an inlet pipe 31, which may be fluidly coupled to the HP piping 23 or the IP piping 24, an outlet pipe 32, which may be fluidly coupled to an HP or IP section of the steam turbine 26 and a valve assembly 33 interposed between the inlet pipe 31 and the outlet pipe 32. The valve assembly 33 includes a valve seat 34, a center body 35 and a poppet element 36 that is movable (in the direction of arrows X-X) along the center body 35 relative to the valve seat 34 to occupy and move between first and second positions. At the first position (not shown for ease of illustration), the poppet element 36 is displaced from the valve seat 34 and fluid flow is permitted to proceed from the inlet pipe 31 to the outlet pipe 32. At the second position (as illustrated in FIG. 2), the poppet element 36 contacts the valve seat 34 and fluid flow from the inlet pipe 31 to the outlet pipe 32 is prevented.

The center body 35 includes a main member 352, which may be referred to as an upperhead bushing, and which is fixed in position relative to valve seat 34 and a movable member 351, which may be referred to as a valve stem, and which is movable with the poppet element 36 such that the center body 35 as a whole is partially fixed relative to the valve seat 34. The main member 352 includes a tubular member 353 and an inner flange 354 that extends radially outwardly from the tubular member 353. The poppet element 36 includes an upper head 361, a balance chamber wall 362, a valve disk 363 and a balance chamber holder 364. The balance chamber wall 362 may be an annular-shaped member disposed about the center body 35 to define an annulus 37 within the balance chamber 10. An upper portion of the valve disk 363 has a clearance fit with the balance chamber wall 362 through a fastening member 38 and a seal element 39. The clearance is provided so that the valve disk 363 can be moved open or closed relatively smoothly within the balance chamber wall 362. A lower portion of the valve disk 363 is shaped to register with the valve seat 34 when the poppet element 36 occupies the second position (as illustrated in FIG. 2).

An upper portion of the balance chamber wall 362 includes an outer flange 365 that extends radially inwardly from the balance chamber wall 362. In accordance with embodiments, the inner flange 354 includes an axial facing surface 40 and a radial facing surface 41 and the outer flange 365 includes an axial facing surface 42 and a radial facing surface 43. The axial facing surfaces 40 and 42 may be substantially co-planar while the radial facing surfaces 41 and 43 may be substantially parallel with one another. The outer flange 365 may also include an axial protrusion 366 that protrudes axially beyond a plane of an axial face of the balance chamber wall 362. The inner flange 354 may extend axially beyond the axial protrusion 366.

The balance chamber holder 364 is affixed to the upper head 361 by a fastening element 50 and includes a lower portion 60 and an upper portion 61. The lower portion 60 and the upper portion 61 may be formed integrally with one another or, in accordance with alternative embodiments, may be formed as separate parts that are fastened together by the fastening element 50. The fastening element 50 may be torqued to a designed pre-stress and include a threaded bolt and a head portion that extends through the balance chamber holder 364 to register with threading provided in or on the upper head 361. The head portion interferes with a lower surface of the balance chamber holder 364 such that rotation of the fastening element 50 about a longitudinal axis thereof draws the head portion and the balance chamber holder 364 toward the upper head 361 in a tightening direction. In accordance with embodiments, a clearance C will be provided between a lower surface of the upper head 361 and an upper surface of the upper portion 61.

The fastening element 50 may be provided as a plurality of fastening elements 50 and may be arrayed around the center body 35 in an annular-shaped array.

The lower portion 60 includes an inner axial facing surface 600 and an outer axial facing surface 601 and the upper portion 61 includes an inner radial facing surface 610 and an outer radial facing surface 611. The balance chamber holder 364 is disposable such that the lower portion 60 is disposed between corresponding portions of the balance chamber wall 362 and the tubular member 353 and such that the upper portion 61 is disposed between corresponding portions of the outer flange 365 and the inner flange 354. In this position, the inner axial facing surface 600 may abut and interfere with the axial facing surface 40 of the inner flange 354 and the outer axial facing surface 601 may abut and interfere with the axial facing surface 42 of the outer flange 365. Similarly, the inner radial facing surface 610 may abut and register with the radial facing surface 41 of the inner flange 354 and the outer radial facing surface 611 may abut and register with the radial facing surface 43 of the outer flange 365.

In accordance with embodiments, the balance chamber holder 364 may be made of a material that has a CTE that is similar to or matched with the CTE of the upper head 361 material.

With the configuration described above, the fastening element 50 extends through the upper head 361 and the balance chamber holder 364 and the upper head 361 and the balance chamber holder 364 have similar CTEs such that the upper head 361 and the balance chamber holder 364 thermally expand and contract at similar rates. As such, bending stresses on the fastening element 50 may be limited or reduced while shear stresses on the upper head 361 may be similarly limited or reduced. Also, with the clearance C provided between the lower surface of the upper head 361 and the upper surface of the upper portion 61, a non-existent or substantially limited contact pressure exists between the upper head 361 and the balance chamber holder 364 during varied operational conditions. This ensures, because of the torques in fastening element 50, that there is high contact stress between the outer flange 365 and the upper head 361, and thereby provides for prevention of steam leakage between the balance chamber 10 and the upper head 361, and thereby provides for prevention of steam leakage between the balance chamber 10 and the upper head 361.

In addition, the lower portion 60 of the balance chamber holder 364 is provided with room to thermally expand and contract during, e.g., startup and shut down operations. That is, during the startup and shut down operations or other varied operational conditions, the lower portion 60 of the balance chamber holder 364 may expand radially outwardly or contract radially inwardly but, in either case, the inner axial facing surface 600 continues to abut and interfere with the axial facing surface 40 of the inner flange 354 while the outer axial facing surface 601 continues to abut and interfere with the axial facing surface 42 of the outer flange 365. Thus, the thermal expansion and contraction of portions of the balance chamber holder 364 can proceed without transference of thermal loads onto the fastening element 50 or the upper head 361.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A poppet element of a valve, which is movable relative to a valve seat of the valve and comprises:
   a balance chamber wall defining a balance chamber with a center body partially fixed relative to the valve seat;
   an upper head;
   a balance chamber holder having a coefficient of thermal expansion (CTE) that is matched with that of the upper head; and
   a fastening element disposed to fasten the balance chamber holder to the upper head,
   the balance chamber holder being disposed between the center body and the balance chamber wall and configured to prevent thermal loading transfer from the balance chamber wall to the fastening element.

2. The poppet element according to claim 1, wherein the balance chamber holder comprises forged 12. Chrome material.

3. The poppet element according to claim 1, wherein a clearance is provided between the upper head and the balance chamber holder.

4. The poppet element according to claim 1, wherein the balance chamber wall comprises an outer flange and the balance chamber holder comprises a lower portion that abuts and interferes with the outer flange during varied operational conditions.

5. The poppet element according to claim 1, wherein the balance chamber wall comprises an outer flange and the balance chamber holder comprises a lower portion that abuts and interferes with the outer flange despite thermal expansion or contraction thereof.

6. A power plant valve comprising a poppet element movable relative to a valve seat, the poppet element comprising:
   a balance chamber wall defining a balance chamber with a center body partially fixed relative to the valve seat;
   an upper head;
   a balance chamber holder having a coefficient of thermal expansion (CTE) that is matched with that of the upper head; and
   a fastening element disposed to fasten the balance chamber holder to the upper head,
   the balance chamber holder being disposed between the center body and the balance chamber wall and configured to prevent thermal loading transfer from the balance chamber wall to the fastening element.

7. The power plant valve according to claim 6, wherein the balance chamber holder comprises forged 12. Chrome material.

8. The power plant valve according to claim 6, wherein a clearance is provided between the upper head and the balance chamber holder.

9. The power plant valve according to claim 6, wherein the balance chamber wall comprises an outer flange and the balance chamber holder comprises a lower portion that abuts and interferes with the outer flange during varied operational conditions.

10. The power plant valve according to claim 6, wherein the balance chamber wall comprises an outer flange and the balance chamber holder comprises a lower portion that abuts and interferes with the outer flange despite thermal expansion or contraction thereof.

11. A power plant comprising a boiler element, a steam turbine, piping disposed to transport steam from the boiler element and toward the steam turbine and a valve disposed along the piping, the valve comprising:
    a valve seat; and
    a poppet element, which is movable relative to the valve seat to open or close the valve, the poppet element comprising:
    a balance chamber wall defining a balance chamber with a center body partially fixed relative to the valve seat;
    an upper head;
    a balance chamber holder having a coefficient of thermal expansion (CTE) that is matched with that of the upper head; and
    a fastening element disposed to fasten the balance chamber holder to the upper head,
    the balance chamber holder being disposed between the center body and the balance chamber wall and configured to prevent thermal loading transfer from the balance chamber wall to the fastening element.

12. The power plant according to claim 11, wherein the piping comprises IP or HP piping.

13. The power plant according to claim 11, wherein the piping is disposed to transport steam toward IP or HP sections of the steam turbine.

14. The power plant according to claim 11, wherein the valve comprises a reheat valve.

15. The power plant according to claim 11, wherein the balance chamber holder comprises forged 12. Chrome material.

16. The power plant according to claim 11, wherein a clearance is provided between the upper head and the balance chamber holder.

17. The power plant according to claim 11, wherein the balance chamber wall comprises an outer flange and the balance chamber holder comprises a lower portion that abuts and interferes with the outer flange during varied operational conditions.

18. The power plant according to claim 11, wherein the balance chamber wall comprises an outer flange and the balance chamber holder comprises a lower portion that abuts and interferes with the outer flange despite thermal expansion or contraction thereof.

* * * * *